(12) United States Patent
Polak et al.

(10) Patent No.: US 12,189,467 B2
(45) Date of Patent: Jan. 7, 2025

(54) METHOD TO IMPROVE ACCURACY IN FAULT TREE ANALYSIS (FTA)

(71) Applicant: Hub data security Ltd., Tel Aviv (IL)

(72) Inventors: Rafi Polak, Mizpe Aviv (IL); Andrey Iaremenko, Bat Yam (IL)

(73) Assignee: Hub Data Security Ltd., Tel Aviv (IL)

( * ) Notice: Subject to any disclaimer, the term of this patent is extended or adjusted under 35 U.S.C. 154(b) by 33 days.

(21) Appl. No.: 18/165,313

(22) Filed: Feb. 6, 2023

(65) Prior Publication Data

US 2023/0251922 A1      Aug. 10, 2023

Related U.S. Application Data

(60) Provisional application No. 63/267,592, filed on Feb. 4, 2022.

(51) Int. Cl.
*G06F 11/00* (2006.01)
*G06F 11/07* (2006.01)

(52) U.S. Cl.
CPC .......... *G06F 11/079* (2013.01); *G06F 11/076* (2013.01)

(58) Field of Classification Search
CPC .............. G06F 11/079; G06F 11/076

USPC ........................................................ 714/1–57
See application file for complete search history.

(56) References Cited

U.S. PATENT DOCUMENTS

| | | | | |
|---|---|---|---|---|
| 4,870,575 A | * | 9/1989 | Rutenberg | G06F 11/00 716/136 |
| 2007/0150772 A1 | * | 6/2007 | Berenbach | G06F 11/2257 714/25 |
| 2009/0083576 A1 | * | 3/2009 | Vlassova | G06F 30/20 714/26 |
| 2012/0330501 A1 | * | 12/2012 | Sundaram | G05B 23/0248 701/33.9 |
| 2013/0317780 A1 | * | 11/2013 | Agarwal | G05B 23/0248 702/181 |
| 2015/0100930 A1 | * | 4/2015 | Allred | G06F 9/5044 716/104 |
| 2015/0193290 A1 | * | 7/2015 | He | G06F 11/079 714/37 |
| 2021/0192867 A1 | * | 6/2021 | Fang | G07C 5/0816 |
| 2021/0334443 A1 | * | 10/2021 | De | G06F 30/30 |

* cited by examiner

*Primary Examiner* — Sarai E Butler
(74) *Attorney, Agent, or Firm* — Reches Patents

(57) ABSTRACT

A method for fault tree analysis (FTA) of a system, the method may include (i) preforming FTA of the system using multiple hybrid events to provide a FTA result, wherein each hybrid event represents both latent failure modes and evident failure modes; and (ii) responding to the FTS result.

18 Claims, 5 Drawing Sheets

PRIOR ART

| 810 | 820 | 830 |

METHOD TO IMPROVE ACCURACY IN FAULT TREE ANALYSIS (FTA)

CROSS REFERENCE

This application claims priority from U.S. provisional patent Ser. No. 63/267,592 filing date Feb. 4, 2022 which is incorporated herein by its entirety.

BACKGROUND OF THE INVENTION

One of the most popular methods used for Safety Assessment is Fault Tree Analysis (FTA).

Fault Tree Analysis is a deductive method for identifying the numerous ways in which equipment failures, software failures, human error, environmental factors, and external events can lead to accidents or other undesirable conditions. A Fault Tree model consists of a top event and a connecting logic structure of events that must take place in order for the undesired top event to result. Basic events, which represent a simple failure or fault, are the building blocks of the model. It may be a hardware failure, a human error, or an adverse condition. Hardware failures are usually expressed in terms of a specific component and a failure mode.

Failure modes (FM) are products of the FMECA (Failure Mode Effect Criticality Analysis). While performing FMECA, experts define NHE (Next Higher Effect) for each FM. Such NHE becomes FM's of the next higher element/equipment or in other words summary of the lower level FM's. In aerospace (ARP 4761) this summary is called FMES (Failure Modes and Effects Summary). Failure Modes from FMES are used as an input to the FTA.

Equipment failure modes are divided into two types: detected and undetected (detected or not before the mission, e.g. during Pre Flight Test). Detected failure modes presented in the FTA using Evident basic events (FIG. 1) and Undetected failure modes presented using Latent basic events (FIG. 2).

During FTA, failure modes from FMES become Basic Events in FTA. Such failure modes may include two portions evident (detected) and latent (undetected).

If for the failure mode including two portions—evident basic event will be used—resulting probability will be optimistic, if Latent basic event will be used—resulting probability will be pessimistic. In both scenarios—the resulting probability will be wrong.

There may be a need to use an expert to calculate manually coverage (detected portion) of the FM.

The expert may need to create manually OR Gate with two events: Evident and Latent, with modified Failure Rate, according to Coverage (FIG. 3).

Such approach very time consumable, opportunity to mistakes, practically mission impossible after design changes.

SUMMARY

There may be provided a system, a method and a non-transitory computer readable medium for FTA.

There may be provided a method for fault tree analysis (FTA) of a system, the method may include preforming FTA of the system using multiple hybrid events to provide a FTA result, wherein each hybrid event represents both latent failure modes and evident failure modes; and responding to the FTA result.

There may be provided a non-transitory computer readable medium for fault tree analysis, the non-transitory computer readable stores instructions for preforming FTA of the system using multiple hybrid events to provide a FTA result, wherein each hybrid event represents both latent failure modes and evident failure modes; and responding to the FTS result.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 8 illustrates an example of a system.

DETAILED DESCRIPTION OF THE DRAWINGS

Figure 1:
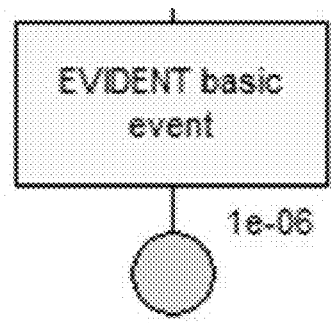
FIG. 1 illustrates an example of a prior art evident basic event.
Figure 2:
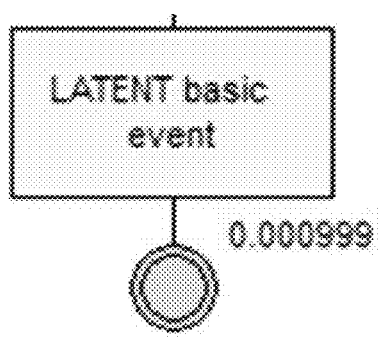
FIG. 2 illustrates an example of a prior art latent basic event.
Figure 3:
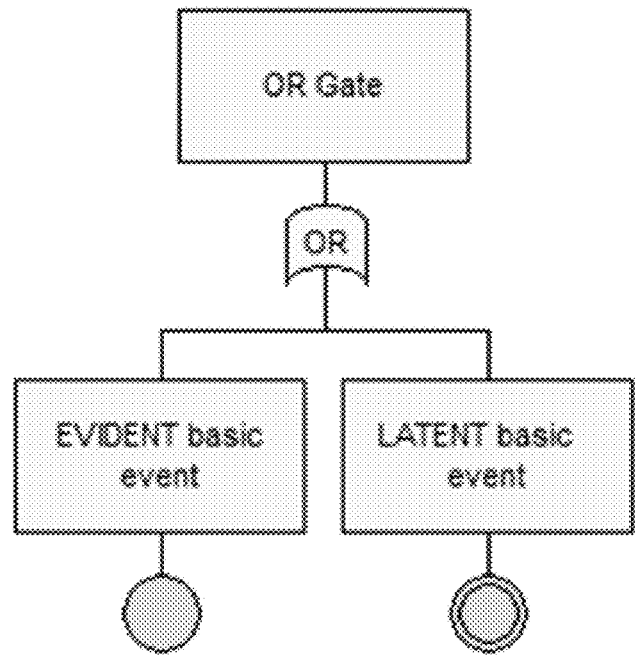
FIG. 3 illustrates an example of a prior art logic OR operation applied on a latent basic event and on a evident basic event.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

There is provided a system, a method, and a non-transitory computer readable medium that stores instructions for FTA using one or more hybrid events.

Figure 4:
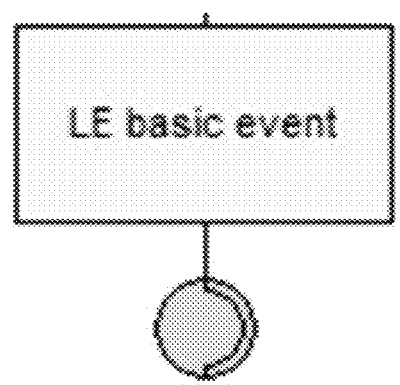
FIG. 4 illustrates an example of a hybrid event.

A hybrid event—is also referred to as a Latent-Evident (LE) event—provides a representation of a latent event and an evident event. See, FIG. 4.

When FM is assigned to such LE basic event, all parameters required for probability calculation, will be assigned automatically, without any manual intervention of the expert.

LE basic event parameters may include:
a. FR—failure rate ($\lambda$).
b. Coverage (Coverage)—percentage of the detected portion of FR. Coverage calculated automatically as result of testability analysis.
c. T inspection (Tinspect)—inspection period for the latent portion of event.

Probability (P) of such event is calculated in relation to a mission to be completed. Thus—P represent the probability of a failure during an execution of the mission. The duration of the mission is denoted Tmission.

P may be calculated according to equation below:

$$P=(\lambda*Coverage*Tmission)+(\lambda*[1-Coverage]*Tinspect). \quad (1)$$

Wherein:
($\lambda$*Coverage*Tmission) may be referred to as a first product.
($\lambda$*[1−Coverage]*Tinspect) may be referred to as a second product.
[1−Coverage] may be referred to as a first value.

In case, there are several (N) latent portions (with N failure rates $\lambda_1$-$\lambda_N$) in the same FM with different inspection periods (of durations Tinspect$_1$-Tinspect$_N$), the following equation will be applicable:

$$p=(\lambda*Coverage*Tmission)+(1-Coverage)*\Sigma_{j=1}^{N}\lambda_j*Tinspect_j \quad (2)$$

There may be provide a method that may include the following steps:
a. Start analysis—Tmission and A are provided and/or calculated.
b. Perform FMECA determine Tinspect.
c. Automatically get FMES.
d. Perform testability analysis and calculate coverage.
e. Construct a fault tree with assigning FMs from FMES to LE basic events.
f. Calculating Fault Tree probability.

Figure 5:
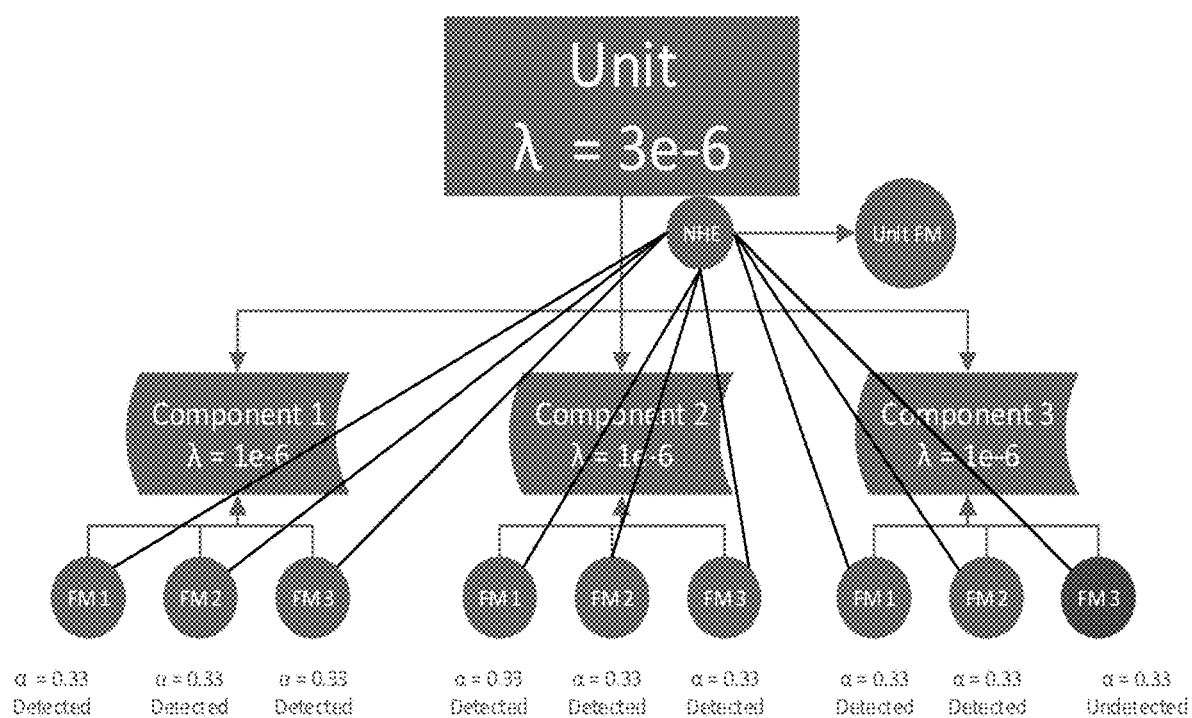
FIG. 5 illustrates an example of a unit that includes three components and of a hybrid event that represent the unit.

FIG. 5 illustrates an example of a hybrid event that represents the failure probability of a unit.

It is assumed that the unit includes three components (each with FR=$10^{-6}$). When performing FMECA we will define (as example) 3 failure modes, with equal failure mode ratio (Alpha—$\alpha$) for each component. All components failure modes, except one, can be detected. For simplification, each component failure mode lead to the same Next Higher Effect on the Unit (actually becoming Unit failure mode).

As result of Testability Analysis we will get automatically Coverage for Unit FM=0.89.

Now assume Tmission is 3 hours and Tinspect (for undetected/latent failure mode) is 1000 hours.

Case 1: Assigning Unit FM to the Evident event type:

$$p=\lambda*T_{mission}=3*10^{-6}*3=9*10^{-6}$$

Case 2: Assigning Unit FM to the Latent event type:

$$p=\lambda*T_{inspect}=3*10^{-6}*1000=3*10^{-3}$$

Case 3: Assigning Unit FM to the new LE Event type:

$$p=\lambda*Coverage*T_{mission}+\lambda*(1-Coverage)*T_{inspect}$$

$$p=3*10^{-6}*0.89*3+3*10^{-6}*(1-0.89)*1000=3.38*10^{-4}$$

By using new method with LE Event resulting probability 38 ($3.38\times10^{-4}/9\times10^{-6}$) times more accurate when comparing with Evident event and 9 ($3\times10^{-3}/3.38\times10^{-4}$) times when comparing with Latent event.

Using the LE event may:
a. Improve accuracy of the probability calculation during Fault Tree Analysis.
b. Avoid mistakes caused by manual data input.
c. Save time required for analysis, as result of full automation.
d. Supports easy analysis updates after design changes.

Figure 6:
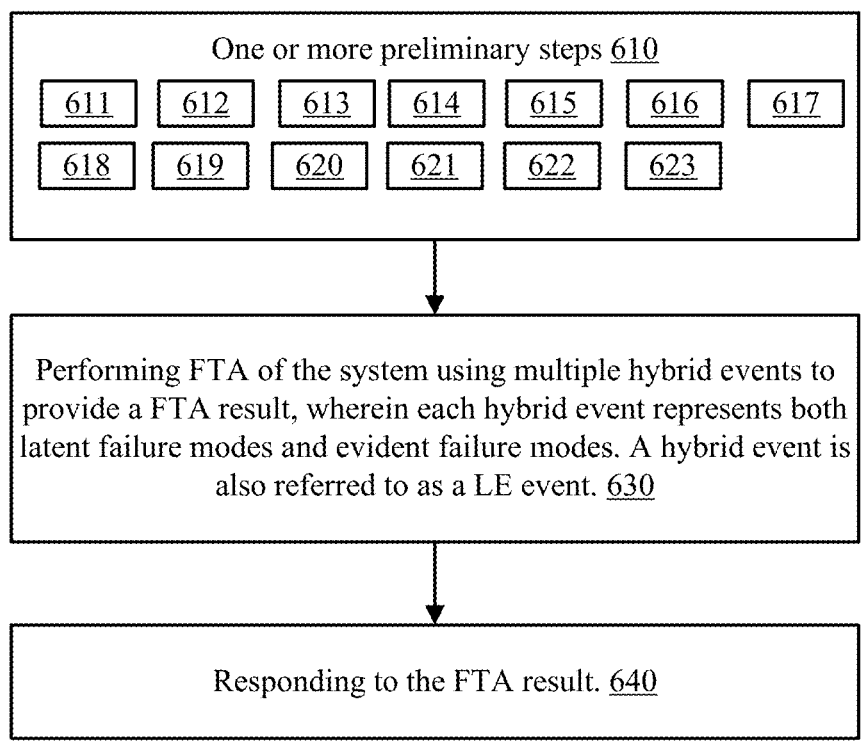
FIG. 6 illustrates an example of a method.

FIG. 6 illustrates method 600 for fault tree analysis (FTA) of a system.

Method 600 may start by one or more preliminary steps—collectively denoted 610.

The one or more preliminary steps may include at least one of:
a. Preforming performing failure more effect criticality analysis (FMECA) to provide FMECA results. (S611)
b. Receiving the FMECA results. (S612)
c. Performing testability analysis to determine coverage. (S613)
d. Receiving the coverage. (S614)
e. Determining hybrid events based on the coverage and the FMECA results. (S615)
f. Receiving the hybrid events. (S616)

Additionally or alternatively, the one or more preliminary steps may include at least one of the following:
a. Calculating a failure probability of a given unit based on (i) one or more failure rates of one or more components of the given unit, (ii) a coverage of the one or more failure rates, and (iii) a duration of an inspection period allocated, at least in part, for finding latent failures. (S617)
b. Calculating a failure probability of a given unit also based on a duration of a mission associated with the FTA. (S618)
c. Calculating a first product by multiplying a failure rate of one or more components of the given unit by a coverage of the failure rate and by a duration of a mission associated with the FTA. (S619)
d. Calculating a second product by multiplying a first value by a duration of an inspection period allocated, at least in part, for finding latent failures; wherein the first value equals one minus the failure rate of one or more components of the given unit. (S620)
e. Adding the first product to the second product. (S621)
f. Calculating the failure probability of the given unit by: p=($\lambda$*Coverage*Tmission)+(1−Coverage) *$\Sigma_{j=1}^{N}\lambda_j$*Tinspect$_j$. (S622)

g. Calculating the failure probability of the given unit by: P=($\lambda$*Coverage*Tmission)+($\lambda$*[1−Coverage]*Tinspect). (S623)

The one or more preliminary steps 610 may be followed by step 630 of performing FTA of the system using multiple hybrid events to provide a FTA result, wherein each hybrid event represents both latent failure modes and evident failure modes. A hybrid event is also referred to as a LE event.

Different hybrid events of the multiple hybrid events may be related to different units of the system.

A given hybrid event (one of the hybrid events) is indicative of a failure probability of a given unit.

The system may include multiple units and a failure of the system may occur when one or more combinations of unit failures occur. Step 630 may find and/or receive these combination, and may use the failure probabilities of the different units (represented by events—the events may include hybrid events—but also may include non-hybrid events) to find the probability of the system failure. Logic operations may be applied on various events to determine a probability of system failures.

Step 630 may be followed by step 640 of responding to the FTS result.

Step 640 may include generating an alert, preforming another iteration of step 630, storing the FTA results, amending one or more parameters of the system, and the like.

Figure 7:
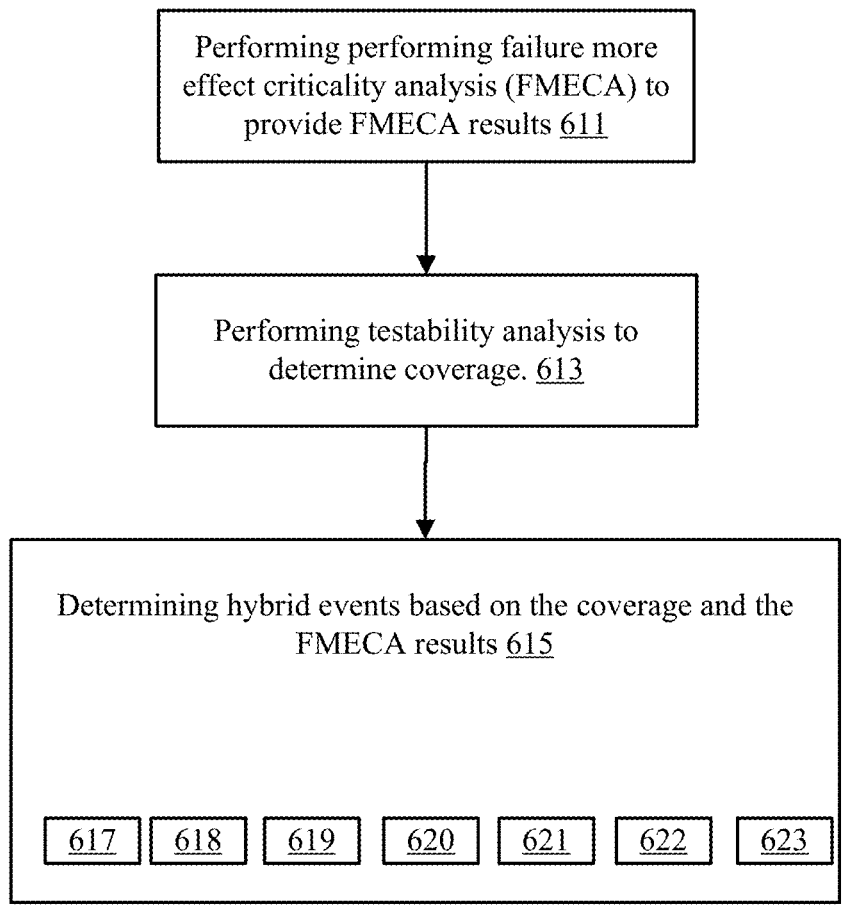
FIG. 7 illustrates an example of a method.

FIG. 7 illustrates an example of method 700 for determining hybrid events.

Method 700 may start by step 611 of preforming performing failure more effect criticality analysis (FMECA) to provide FMECA results.

Step 611 may be followed by step 613 of performing testability analysis to determine coverage.

Step 613 may be followed by step 615 of determining hybrid events based on the coverage and the FMECA results.

Step 615 may include at least one of the following:
a. Step 617 of calculating a failure probability of a given unit based on (i) one or more failure rates of one or more components of the given unit, (ii) a coverage of the one or more failure rates, and (iii) a duration of an inspection period allocated, at least in part, for finding latent failures.
b. Step 618 of calculating a failure probability of a given unit also based on a duration of a mission associated with the FTA.
c. Step 619 of calculating a first product by multiplying a failure rate of one or more components of the given unit by a coverage of the failure rate and by a duration of a mission associated with the FTA.
d. Step 620 of calculating a second product by multiplying a first value by a duration of an inspection period allocated, at least in part, for finding latent failures; wherein the first value equals one minus the failure rate of one or more components of the given unit.
e. Step 621 of adding the first product to the second product.
f. Step 622 of calculating the failure probability of the given unit by: p=($\lambda$*Coverage*Tmission)+(1−Coverage)*$\Sigma_{j=1}^{N}\lambda_j$*Tinspect$_j$.
g. Step 623 of calculating the failure probability of the given unit by: P=($\lambda$*Coverage*Tmission)+($\lambda$*[1−Coverage]*Tinspect).

Figure 8:
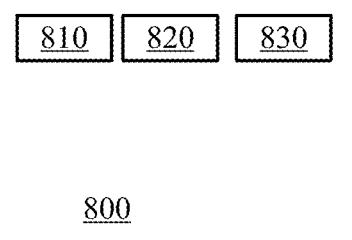

FIG. 8 illustrates an example of a system 800.

System 800 is a computerized system that may include a processor 810, a memory unit 820 and a man machine interface 830 that may include a display and/or an audio communication unit such as a microphone and/or a speaker. The processor may include one or more processing circuits. A processing circuit may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

The system 800 may be a part of a vehicle or may not be a part of a vehicle.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for fault tree analysis (FTA) of a system, the method comprises:
preforming FTA of the system using multiple hybrid events related to multiple units of the system to provide a FTA result, wherein each hybrid event represents both latent failure modes and evident failure modes related to one of the multiple units of the system and is associated with a single failure rate and a single failure probability of a single unit; and responding to the FTA result.

2. The method according to claim 1, wherein a given hybrid event is indicative of a failure probability of a given unit.

3. The method according to claim 2, wherein the failure probability of the given unit is calculated based on (i) one or more failure rates of one or more components of the given unit, (ii) a coverage of the one or more failure rates, and (iii) a duration of an inspection period allocated, at least in part, for finding latent failures.

4. The method according to claim 2, wherein the failure probability of the given unit is calculated also based on a duration of a mission associated with the FTA.

5. The method according to claim 2, comprising calculating the failure probability of the given unit based on (i) one or more failure rates of one or more components of the given unit, (ii) a coverage of the one or more failure rates, and (iii) a duration of an inspection period allocated, at least in part, for finding latent failures.

6. The method according to claim 2, comprising calculating the failure probability of the given unit by:
calculating a first product by multiplying a failure rate of one or more components of the given unit by a coverage of the failure rate and by a duration of a mission associated with the FTA,
calculating a second product by multiplying a first value by a duration of an inspection period allocated, at least in part, for finding latent failures; wherein the first value equals one minus the failure rate of one or more components of the given unit; and
adding the first product to the second product.

7. The method according to claim 1, wherein the preforming FTA is preceded by performing failure more effect criticality analysis (FMECA) to provide FMECA results.

8. The method according to claim 7, comprising performing testability analysis to determine a coverage.

9. The method according to claim 8, comprising determining the hybrid events based on the coverage and the FMECA results.

10. A non-transitory computer readable medium for fault tree analysis of a system, the non-transitory computer readable stores instructions for: preforming FTA of the system using multiple hybrid events related to multiple units of the system, to provide an FTA result, wherein each hybrid event represents both latent failure modes and evident failure modes is related to one of the multiple units of the system and is associated with a single failure rate and a single failure probability of a single unit; and responding to the FTA result.

11. The non-transitory computer readable medium according to claim 10, wherein a given hybrid event is indicative of a failure probability of a given unit.

12. The non-transitory computer readable medium according to claim 11, wherein the failure probability of the given unit is calculated based on (i) one or more failure rates of one or more components of the given unit, (ii) a coverage of the one or more failure rates, and (iii) a duration of an inspection period allocated, at least in part, for finding latent failures.

13. The non-transitory computer readable medium according to claim 11, wherein the failure probability of the given unit is calculated also based on a duration of a mission associated with the FTA.

14. The non-transitory computer readable medium according to claim 11, that stores instructions for calculating the failure probability of the given unit based on (i) one or more failure rates of one or more components of the given unit, (ii) a coverage of the one or more failure rates, and (iii) a duration of an inspection period allocated, at least in part, for finding latent failures.

15. The non-transitory computer readable medium according to claim 11, that stores instructions for calculating the failure probability of the given unit by:
calculating a first product by multiplying a failure rate of one or more components of the given unit by a coverage of the failure rate and by a duration of a mission associated with the FTA,
calculating a second product by multiplying a first value by a duration of an inspection period allocated, at least in part, for finding latent failures; wherein the first value equals one minus the failure rate of one or more components of the given unit; and
adding the first product to the second product.

16. The non-transitory computer readable medium according to claim 10, wherein the preforming FTA is preceded by performing failure more effect criticality analysis (FMECA) to provide FMECA results.

17. The non-transitory computer readable medium according to claim 16, that stores instructions for performing testability analysis to determine a coverage.

18. The non-transitory computer readable medium according to claim 17, that stores instructions for determining the hybrid events based on the coverage and the FMECA results.

* * * * *